United States Patent [19]
Stone et al.
[11] 4,265,305
[45] May 5, 1981

[54] MOUNTING AND SHOCK ABSORBER ASSEMBLY FOR BOREHOLE TELEMETRY APPARATUS

[75] Inventors: Frederick A. Stone, Durham; Normand P. Holcomb, Warehouse Point, both of Conn.

[73] Assignee: Teleco Oilfield Services Inc., Middletown, Conn.

[21] Appl. No.: 70,154

[22] Filed: Aug. 27, 1979

[51] Int. Cl.[3] .......................... E21B 47/12; F16F 7/12; G01D 11/10; G01L 19/14

[52] U.S. Cl. ...................................... 166/113; 73/430; 73/431; 267/141.2

[58] Field of Search .................. 166/113, 250; 175/40; 73/430, 431, 151; 267/137, 125, 141.1, 141.2, 153

[56] References Cited

U.S. PATENT DOCUMENTS

| | | | |
|---|---|---|---|
| 2,577,599 | 12/1951 | Bethancourt | 73/431 X |
| 3,167,966 | 2/1965 | Ashleman | 73/430 X |
| 3,606,297 | 9/1971 | Webb | 267/137 X |
| 3,714,831 | 2/1973 | Quichaud et al. | 175/40 X |
| 3,782,464 | 1/1974 | Quichaud et al. | 175/65 X |
| 4,130,000 | 12/1978 | Burge | 267/125 X |

*Primary Examiner*—Stephen J. Novosad
*Attorney, Agent, or Firm*—Fishman and Van Kirk

[57] ABSTRACT

A mounting assembly and shock absorber are presented for mounting and shock absorption for the transmitter and sensor elements of a mud pulse telemetry system. The shock absorbing apparatus for the mud pulse transmitter is entirely located at one end of the assembly above the transmitter, and the shock absorber apparatus for the sensor package is located at the other end of the assembly below the sensor package, whereby all of the elements can be incorporated in a one piece drill collar.

12 Claims, 7 Drawing Figures

MOUNTING AND SHOCK ABSORBER ASSEMBLY FOR BOREHOLE TELEMETRY APPARATUS

BACKGROUND OF THE INVENTION

This invention relates to the field of borehole telemetry, especially mud pulse telemetry wherein data relating to borehole parameters is gathered by sensing instruments located downhole in the drill string and is transmitted to the surface via pressure pulses created in the drilling mud. More particularly, this invention relates to a shock absorber assembly wherein the mud pulse transmitter and the sensor elements are encased in a single one piece segment of a drill collar, the shock absorber assembly for the mud pulse transmitter being positioned entirely at the top or front end of the drill collar above the mud pulse transmitter, and the entire shock absorber assembly for the sensor elements being positioned at the rear or bottom end of the drill collar entirely below the sensor package.

The basic concept of mud pulse telemetry for transmitting borehole data from the bottom of a well to the surface has been known for some time. United States Pat. Nos. 4,021,774, 4,013,945 and 3,982,431, all of which are owned by the assignee of the present invention, show various aspects of a mud pulse telemetry system which has been under development by the assignee hereof for several years. During the course of development of a mud pulse telemetry system, particular attention has been paid to component mounting and shock absorber assemblies. Mounting and shock absorber assemblies are shown in U.S. Pat. Nos. 3,714,831 and 3,782,464. While the mounting and shock absorber assemblies of those patents are adequate for some purposes, they pose assembly and other problems, and the drill collar in which they are mounted must be in two pieces in order to have access to the shock absorber elements for assembly. The requirement for a two piece drill collar posed by those prior shock absorber assemblies poses several disadvantages. Joints in a drill collar pose several well recognized problems. They result in two different internal diameters, they provide locations for concentration of flex stressing which may lead to structural failure, and they are sources of potential leakage. While joints, of necessity, must occur at the junction of each segment of drill pipe, it is desirable to avoid any more joints than necessary; so it became desirable to develop a mounting and shock absorber system which does not require a split drill collar segment. The prior art has also posed problems in failure to isolate various system components from shock loads imposed on other components.

SUMMARY OF THE INVENTION

The present invention presents a shock absorber assembly wherein the shock absorber components for the mud pulse transmitter are all located and positioned at one end of a drill collar segment above and mud pulse transmitter; while the shock absorber components for the borehole parameter sensing elements are all located at the other end of the drill collar segment below the sensor components. Both of the shock absorber assemblies feature double ended bumpers and an array of flexible rings. Centralizing spiders are positioned at the opposite ends of the components being mounted, i.e., at the opposite ends of the transmitter assembly and the sensor package to complete the assemblies. This arrangement isolates the sensor assembly from shock loads due to pulsing of the mud pulse valve. The ring components of the shock absorber assemblies are keyed to prevent rotation between the component being mounted and the drill collar to secure the components against rotational motion which would result in breakage of electrical connections.

Accordingly, one object of the present invention is to provide a novel and improved mounting and shock absorber assembly for components of a borehole telemetry system.

Another object of the present invention is to provide a novel and improved mounting and shock absorber assembly whereby a mud pulse transmitter and a borehole parameter sensing package can be mounted in a one piece drill collar segment.

Another object of the present invention is to provide a novel and improved mounting and shock absorber assembly for borehole telemetry apparatus which prevents rotation between mounted components and the drill collar.

Another object of the present invention is to provide a novel and improved mounting and shock absorber assembly for a borehole telemetry system wherein some system components are isolated from shock loads imposed on other components.

Still another object of the present invention is to provide a novel and improved mounting and shock absorber assembly for a borehole telemetry system which is characterized by ease of assembly of the components and shock absorber system.

Other objects and advantages will be apparent to and understood by those skilled in the art from the following detailed description and drawings.

BRIEF DESCRIPTION OF THE DRAWINGS

Referring now to the drawings, wherein like elements are numbered alike in the several FIGURES, the overall borehole telemetry system of which this invention forms a part is shown and will be described hereinafter in order to show the environment of the present invention and to provide a better understanding of its operation and advantages.

DESCRIPTION OF THE PREFERRED EMBODIMENT

Figures 1A, 1B, 1C:
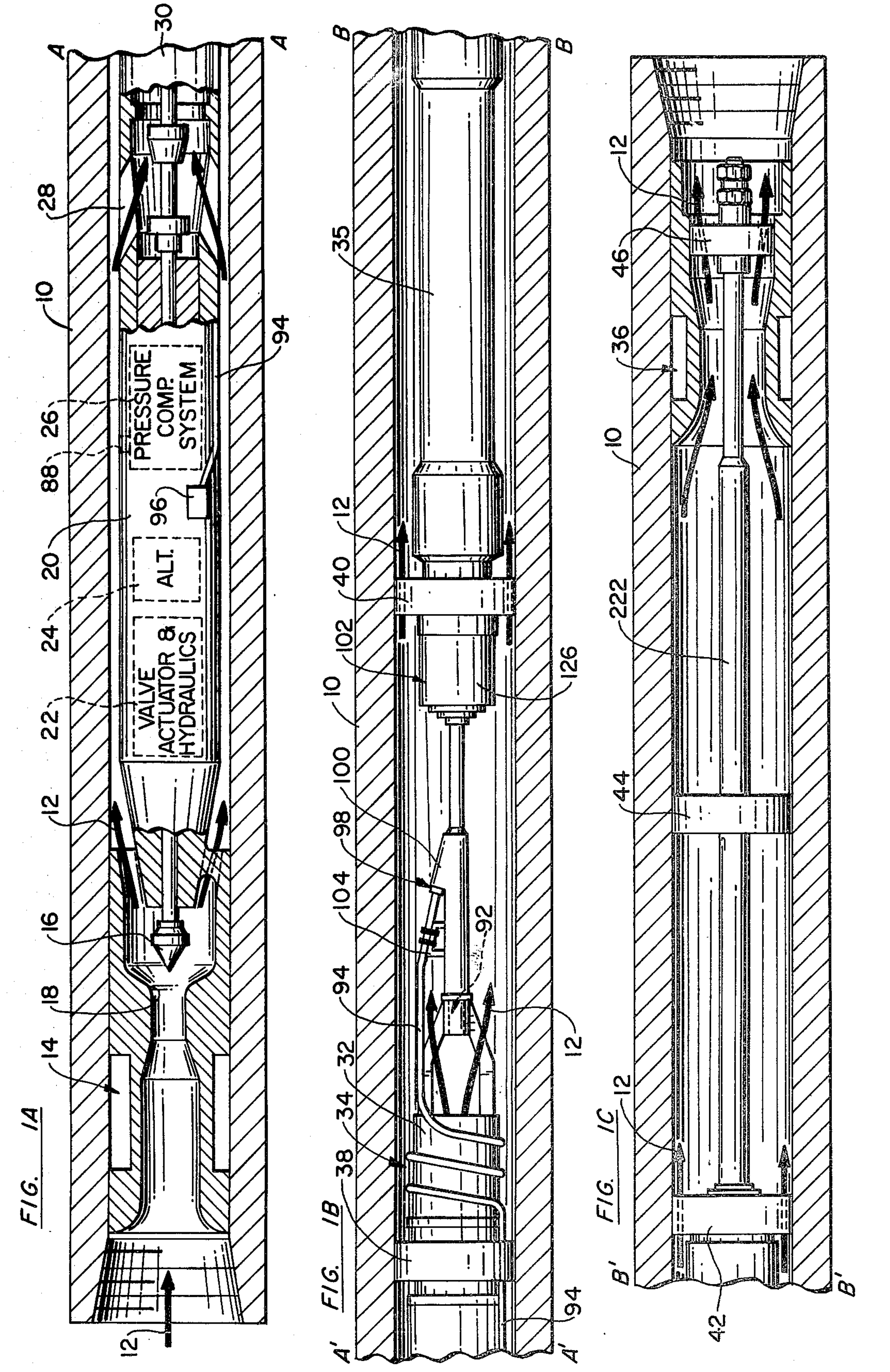
FIGS. 1A, 1B and 1C show sequential segments of a single drill collar segment in which a borehole telemetry system incorporating the present invention is mounted. It is to be understood that FIGS. 1A, 1B and !C are intended to show a single continuous drill collar segment and contents thereof, with the FIGURE being shown in three segments for purposes of illustration of detail.

Referring to FIGS. 1A, 1B and 1C, a general view is shown of the mud pulse telemetry apparatus of which the present invention forms a part. FIGS. 1A, 1B and 1C show a continuous one piece drill collar segment 10 in which the mud pulse telemetry system is housed. This section of the drill string will be located at the bottom of the well being drilled and will be adjacent to or very near to the drill bit. Drilling mud, indicated by the arrows 12, flows into the top of the drill string past a shock absorber assembly 14 to mud pulse valve 16. Actuation of mud pulse valve 16 towards its seat 18 causes information-bearing pressure pulses to be generated in the drilling mud to transmit data to the surface. The drilling mud then flows in an annular passage between the inner wall of drill collar 10 and the external walls of a component housing 20 which includes a valve actuator and hydraulic control system 22 for valve 16, an electrical alternator 24 which supplies electrical power to the sensors, valve actuator and other elements requiring such power in the mud pulse system, and a pressure compensating system 26 which provides pressure balance for the hydraulic fluid operating the mud pulse valve. The mud then flows into the inlet 28 of a mud powered turbine to drive the turbine which, in turn, is physically connected to the rotor of alternator 24 to drive the rotor for generation of electrical power. The discharge end of turbine 30 has a discharge shroud 32 from which the mud discharges into the interior of drill collar 10. A flexible electrical connector assembly 34 is, in part, coiled around discharge shroud 32 and serves to provide electrical communication between alternator 24 and parameter sensors in the system within a housing 35 and between the sensors and the valve actuator 22. The mud then continues to flow in an annular passage between the interior of casing 10 and the exterior of sensor housing 35 which contains sensors for determining borehole parameters, such as directional parameters or any other parameters which are desired to be measured. The mud then continues to flow past a second shock absorber assembly 36 which provides shock absorption for sensor housing 35, and the mud is then discharged from the downstream end of the drill collar segment 10 to the drill bit or to the next successive down hole drill collar segment. The components described above are mounted and located within the interior of drill collar segment 10 by the combined action of shock absorber assemblies 14 and 36 and a series of mounting and centralizing spiders 38, 40, 42, 44 and 46. These spiders have central metal rings with star shaped rubber bodies to permit mud flow past the spiders.

Figure 4:
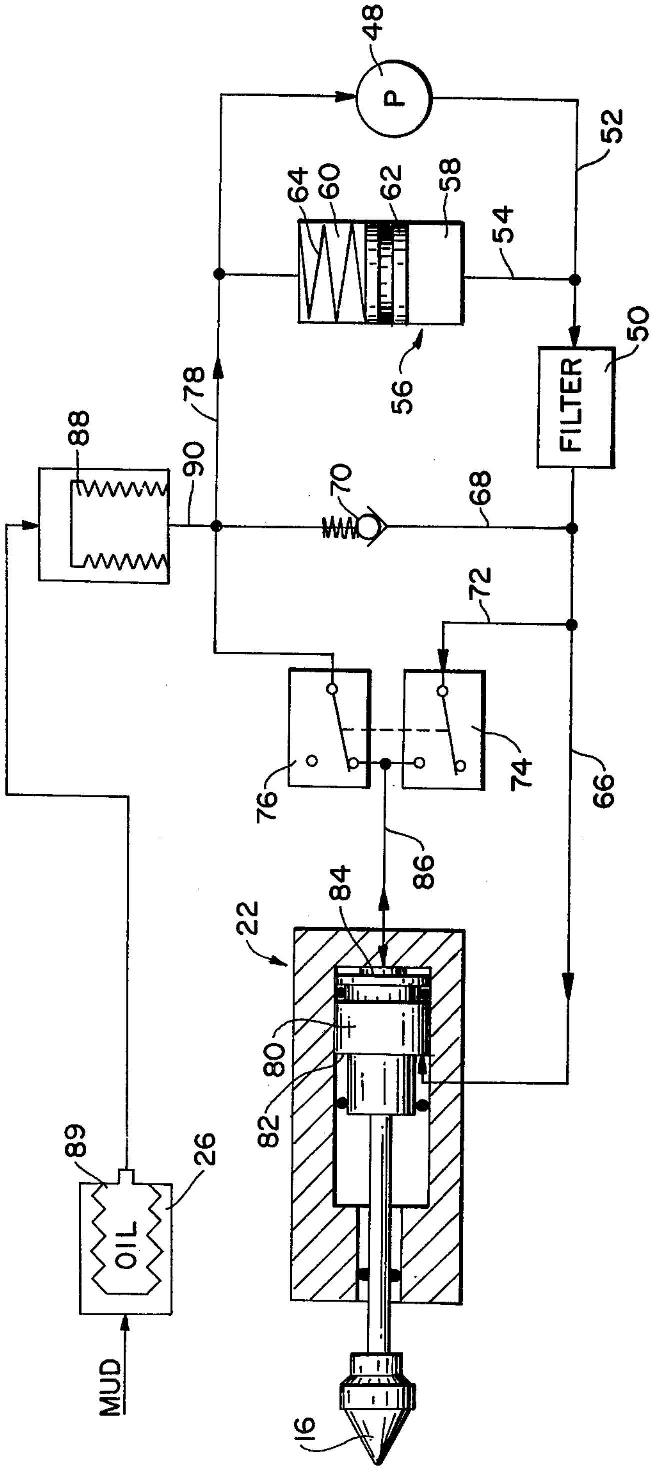
FIG. 4 shows a schematic of the hydraulic circuit.

Referring now to FIG. 4, a schematic of the hydraulic circuit and control system for operating mud pulse valve 16 is shown. A pump 48 delivers hydraulic fluid at 750 psi to a filter 50 via a conduit 52. A branch line 54 from conduit 52 upstream of filter 50 connects to an accumulator 56 which has a storage chamber 58 and a back pressure chamber 60 divided by a piston 62 which is loaded by a spring 64. Accumulator 56 serves to store fluid at pump discharge pressure and deliver it to the system when and if needed during operation of the mud pulse valve.

The hydraulic fluid from filter 50 is delivered via conduit 66 to valve actuator 22 and via branch conduit 68 to a regulating and relief valve 70 and via a branch conduit 72 to one port of a two-way solenoid valve 74 which forms one of a pair of two two-way solenoid valves, 74 and 76. One port of two-way solenoid valve 76 is connected to a return conduit 78 which returns hydraulic fluid to pump 48; and conduit 78 is also connected to the back side of regulating and relief valve 70 and to back pressure chamber 60 of accumulator 56.

Valve actuator 22 houses a piston 80 having unequal front and rear pressure surfaces or areas 82 and 84, respectively, the rear area 84 being larger then the front area 82. Supply conduit 66 delivers pressurized hydraulic fluid to the smaller front area 82 of the piston at all times, while the rear area 84 of the piston communicates, via conduit 86, with either solenoid valve 74 or solenoid valve 76, depending on the states of the solenoid valves. In the condition shown in FIG. 4, solenoid valves 74 and 76 are deenergized, and piston 80 and valve 16 attached thereto are in a retracted position. Thus, high pressure fluid in line 66 acting on the smaller area surface 82 holds piston 80 to the right, while the back surface 84 of the piston is connected via conduit 86 and through valve 76 to return line 78 to the inlet of the pump 48. When it is desired to activate mud pulse valve 16 to generate a pressure pulse in the drilling mud, an actuating signal is delivered to switch the positions of solenoid valves 74 and 76 whereby solenoid valve 74 connects conduit 72 to conduit 86, and solenoid valve 76 is disconnected from conduit 86 and is deadended. In this activated or energized state of the solenoid valves, high pressure hydraulic fluid is delivered to piston surface 84 whereby, because of the larger area of surface 84 than surface 82, piston 80 is moved to the left (even though high pressure fluid is still and at all time imposed on surface 82). The movement of piston 80 to the left carries with it mud pulse valve 16 which approaches valve seat 18 (FIG. 1A) to restrict the flow of mud and thereby build up a signal pressure pulse in the mud. When the solenoid valves are deenergized, piston 80 in mud pulse valve actuator 22 is retracted to the position shown in FIG. 4 to terminate the signal pulse in the mud.

A bellows 88 is filled with hydraulic fluid, and the interior of the bellows communicates via conduit 90 with return conduit 78, and also with the back side of regulating and relief valve 70, the back pressure chambers 60 of accumulator 56 and the inlet of pump 48. The exterior of bellows 88 is exposed to the pressure of oil from the interior of a bellows 89 of the pressure compensating system, 26 which bellows 89 is exposed to the pressure of the drilling mud in the annular conduit between drill collar 10 and component housing 20 (see also FIG. 1A). Thus, environmental changes in the pressure of the drilling mud are sensed by bellows 89 and transmitted to bellows 88 and are transduced into the hydraulic system to vary low pressure levels in the hydraulic system as a function of changes in the pressure of the drilling mud. Thus, bellows 88 and 89 serve to provide a pressure balancing or pressure compensating feature to the hydraulic system.

The hydraulic system is extremely reliable and minimizes the number of parts necessary for effective operation. Servo valves, which have been used in prior systems, have been replaced by more reliable two-way solenoid valves. The location of accumulator 56 upstream of filter 50 provides two important advantages. First, fluid supplied from the accumulator to the system when necessary is always filtered before it is delivered to the system. Second, there is no back flow through the filter from the accumulator when the system shuts down, thus avoiding a source of serious potential contamination of the system while eliminating a check valve which would otherwise be required. Also, the location of regulator and relief valve 70 downstream of the filter, rather than upstream thereof, means that all hydraulic fluid returned to pump inlet is filtered, even that which is bypassed through the relief valve. Also, it is to be noted that the small area side of piston 80 is always supplied with hydraulic fluid under pressure, thus eliminating the need for the complexities of having to vent the small area side of the piston to pump inlet.

Returning now to FIGS. 1B, 5, 6 and 7, the flexible connector and details thereof are shown. As previously indicated, sensor housing 35 and component housing 20 must be free to move relative to each other along the axis of drill collar segment 10 in order to accomodate vibration and shock loading in the system. A slip connection or slip joint indicated generally at 92 in FIG. 1B is provided between the discharge end of turbine 30 and sensor housing 35 to accomodate this relative axial movement. This relative axial movement, which may amount to as much as from 0.2 to 0.4 inches, poses serious problems to the integrity of the electrical connections in the system, which problems are overcome by the flexible electrical connector configuration. Electrical conductors must extend between alternator 24 and the sensor devices in sensor housing 35 to power the sensors in the system; and electrical conductors must extend from the sensors to valve actuator 22 to energize solenoids 74 and 76. Those electrical conductors, in the form of regular insulated wires, can extend partially along the interior of component housing 20 but must then emerge from housing 20 and extend along the exterior of housing 20 and exterior portions of turbine 30. Along the remainder of the exterior of housing 20 and along exterior portions of turbine 30 the conductors must be protected from the flow of drilling mud. Therefore, between alternator 24 and sensor housing 35, special provisions must be made to protect the electrical conductors from abrasion from the drilling mud, and relative movement between the sensor housing 35 and component housing 20 must be accommodated to prevent breakage of the electrical conductors. To that end, starting near alternator 24, the electrical conductors are encased in a flexible metal tube 94 which extends from connector 96 (shown in detail in FIG. 6) on the exterior of housing 20 to a physical connection 98 (shown in detail in FIG. 7) on a housing 100 which extends to and is connected to the sensor housing by a connector 102 (shown in detail in FIG. 5). Connectors 96 and 102 are mechanical and electrical connectors, but connection 98 is only a physical connection through which the wires pass.

The exterior of turbine discharge shroud 32 is coated with an elastomer such as rubber to provide a cushioning surface for a major central portion of flexible metal tubing 94 which is coiled in several turns around shroud 32 to form, in effect, a flexible spring which can be extended and contracted in the same manner as a spring. When there is relative axial and/or radial movement between sensor housing 35 and component housing 20 through slip connection 92, the coiled section of tubing 94 contracts or expands as required to accommodate the movement, and the electrical conductors coiled around shroud 32 inside the coils in tubing 94 move with the coils without breaking.

Since the turns of the tubing which form the coil are positioned upstream of the discharge path of the mud from the turbine, the coils are in an area of static mud, and therefore there is little abrasive action of the moving drilling mud on the coils which are perpendicular to the general direction of mud flow. Where tube 94 is exposed to the mud flow, the tube is in general alignment with the direction of mud flow to minimize abrasion on the tube. Also, the tube segment from the end of the coiled section to connection 98 is plasma coated with a hard material such as a tungsten carbide alloy for additional abrasion resistance, and the tube is secured to a support saddle 104 between the turbine discharge and connection 98 to provide further reinforcement against the forces of the mud.

The interior of tube 94 is pressurized with oil to balance the interior pressure of the tube against the pressure of the drilling mud on the exterior of the tube, thus minimizing the pressure differential and force loading across the tube. The pressure of the oil within tube 94 is varied as a function of drilling mud pressure by a bellows in connector 102 to maintain a pressure balance across the tube.

Figure 6:
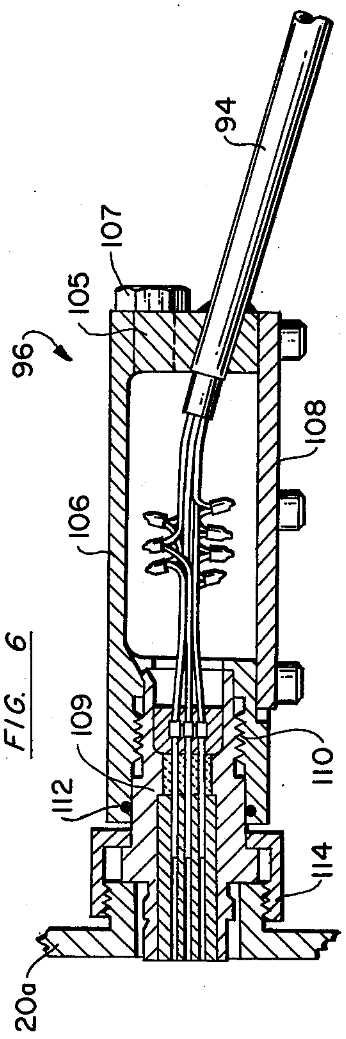

Referring to FIG. 6, the details of connector 96 are shown where tube 94 is connected to the component housing 20. Tube 94 is welded into a junction box 106 which has a removable cover plate 108 whereby access can be had to the interior of the box to splice conductors from the interior of tube 94 to conductors extending from a hermetically sealed pin connector 109. Pin connector 109 is screw threaded into box 106 at 110, and O ring seal 112 seals the interior of box 106. Pin connector 109 is, in turn, fastened to a screw fitting which projects from a portion 20(*a*) of housing 20 by fastening nut 114. Before mounting pin connector 109 on housing segment 20(*a*), the pin elements in connector 109 will be mated with corresponding pin elements connected to conductors which run through housing 20 to the alternator 24 and the valve actuator 22. A port 105, with a plug 107, serves as a bleed orifice and auxiliary fill port when the connector system is being charged with oil.

Figure 7:
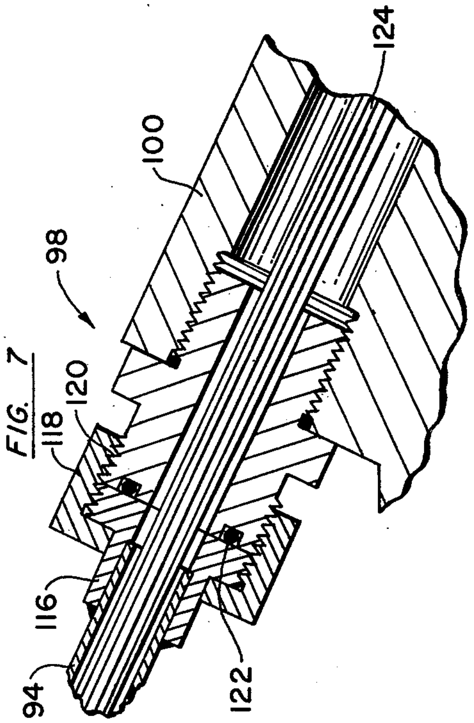

Referring to FIG. 7, the details of the connection 98 of tube 94 to housing 100 are shown. Tube 94 is welded to a flange element 116 which, in turn, is fastened to housing 100 by a nut 118 which overlaps an annular rim on flange 116 and is threaded to an extension of housing 100 at thread connection 120. An O ring seal 122 completes the connection assembly at this location. Housing 100 has a hollow interior channel 124 and forms, in essence, a continuation of tube 94 to house the electrical conductors for connection through connector 102 to sensors in sensor housing 35.

Figure 5:
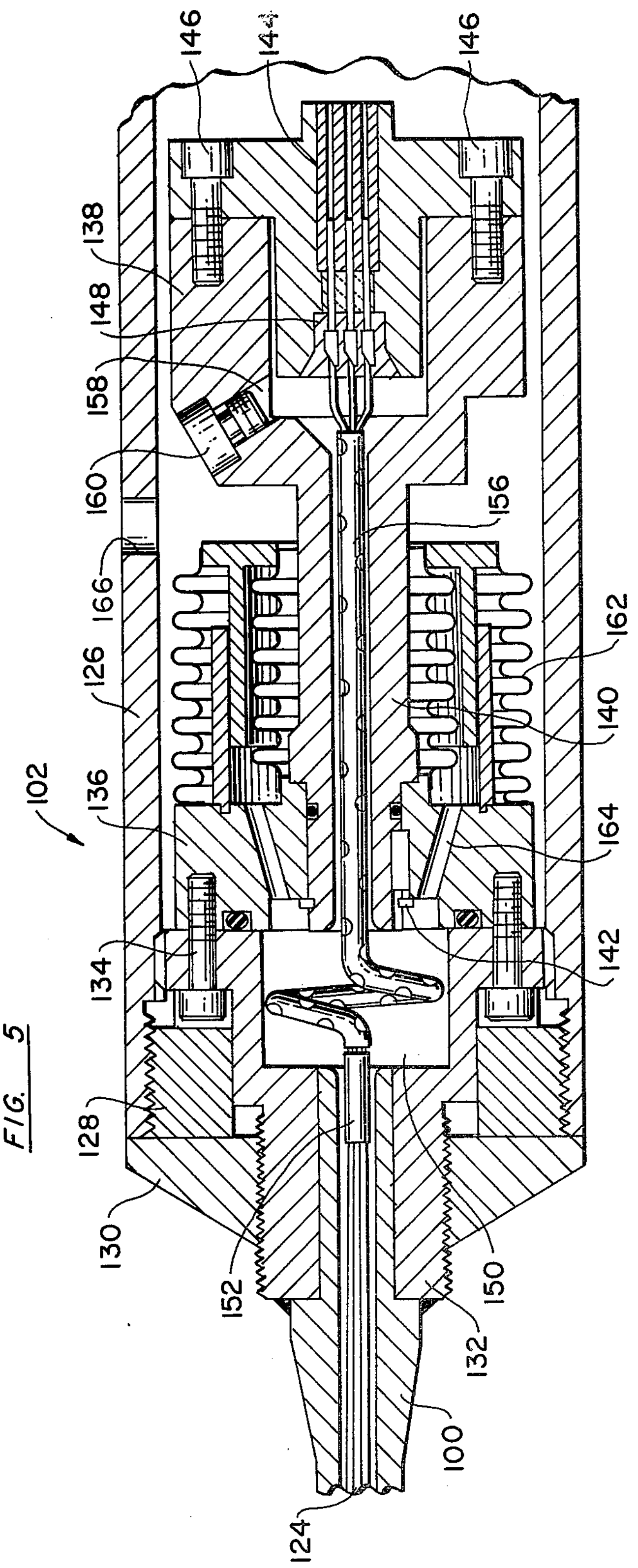
FIGS. 5, 6 and 7 show details of the electrical connector assembly.

The details of connector 102 are shown in FIG. 5 where housing 100 is secured within casing 126 by ring nut 128 screw threaded to the interior of casing 126 and by a stabilizing nut 130 screw threaded to the exterior of a termination element 132. Termination element 132 is welded to the end of housing 100; and termination element 132 is splined within casing 126 to prevent rotation and is fastened by bolts 134 to a ring 136. Stabilizing nut 130 butts against the end of casing 126. This structural interconnection between termination element 132, ring nut 128, stabilizing nut 130 and casing 126 results in transmission of bending and other stresses within connector 102 to casing 126 where those loads can be borne to minimize adverse effects from those loads on the connector.

Still referring to FIG. 5, a transition element 138 has a hollow tubular segment 140 which projects into a central opening in ring 136 and is held in place by a snap ring 142. A hermetically sealed pin type connector 144 is fastened to transition element 138 by bolts 146, and the internal electrical conductors cased within tube 94 and housing 100 pass through the hollow center of tubular segment 140 and are soldered into one end of pin connector 144 at recess 148. A chamber 150 is formed between termination member 130 and ring 136, and the electrical conductors which are housing within tube 94 and housing 100 form a one turn coil in chamber 150 so that the wires and plug 148 can be extended beyond the end of transition element 138 to insert the plug into pin connector 144. The conductors are encased within a short tube 152 which protects against abrasion at the end of element 132. The conductors are also encased within a perforated tube 156 from the end of tubular segment 140 into chamber 150. The perforated tube is twisted on the conductors and heat shrunk to form the coil in chamber 150, and the perforations allow venting of air so the spaces between the conductors can be filled with oil.

As previously indicated, tube 94 is filled with oil for internal pressurization. The oil is introduced into the system through a filler port 158 which is closed off by volume of chamber 150 and tubular segment 140 of connector 102, the entire interior volume of housing 100, the entire interior volume of tube 94 and the entire interior volume of box 106. An annular bellows assembly 162 is welded on rim ring 136, and the interior of the bellows communicates via passages 164 with chamber 150 so that the interior of the bellows is also filled with the oil. The exterior of the bellows is exposed to the drilling mud via ports 166 in casing 126 so that the pressure of the oil responds to changes in the drilling mud pressure to provide balance at all times between the pressure of the oil within tube 94 and the pressure of the drilling mud.

The right hand end of pin connector 144 is connected by any convenient means to electrical conductors extending to the sensor elements in housing 34 to complete the electrical communication in the system. A particularly important feature of the electrical connector assembly is that is can be installed in and removed from the mud pulse telemetry system as a unitary and self contained assembly. The unitary assembly extends from junction box 106 and hermetically sealed pin plug 108 at one end to connector 102 and hermetically sealed pin plug 144 at the other end and all of the connector components in between. The unitary assembly includes the oil contained in the system, since the system is sealed throughout, including the ends which are sealed by the hermetically sealed pin plugs. Thus, if the connector assembly must be removed for any reason (such as for repair or maintenance of it or any other component) it can be removed and reinstalled as an integral and self contained unit, and there is no need to drain the oil and no concern about spilling any oil or having to replace it.

Figure 2:
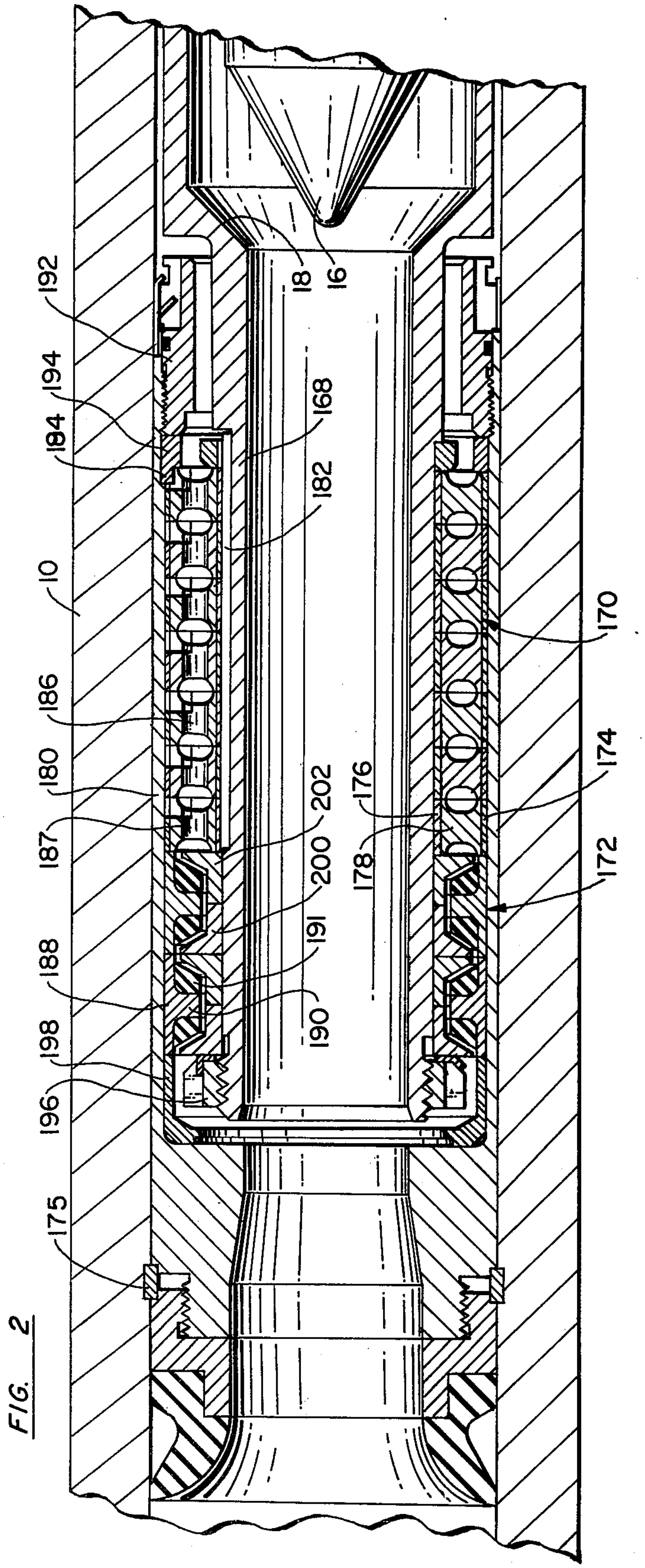
FIG. 2 shows a detail of the front or transmitter end mounting and shock absorber assembly.
Figure 3:
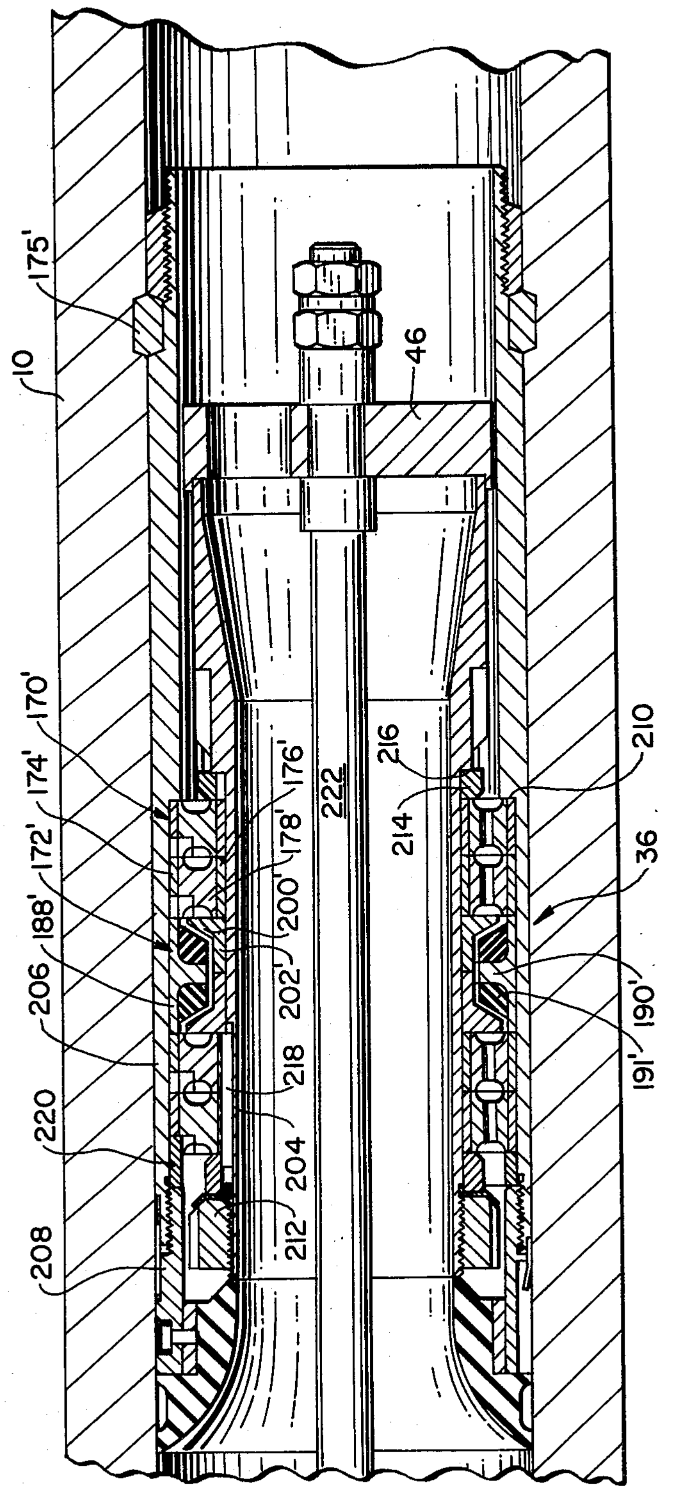
FIG. 3 shows a detail of the rear or sensor package end mounting and shock absorber assembly.

Referring now to a combined consideration of FIGS. 2 and 3, the upper end mounting and shock absorber assembly for the transmitter system is shown in FIG. 2, and the lower end mounting and shock absorber assembly for the sensor assembly is shown in FIG. 3. Both the upper shock absorber assembly and the lower shock absorber assembly are composed of structures of ring elements and bumper elements, and the upper end assembly has more of these ring and bumper elements than the lower end assembly because the mass of the transmitter and associated elements in the upper end is greater than the mass of the sensor elements at the lower end, and it is necessary to damp out both of these masses against the same external system vibrations.

Referring to FIG. 2, the upper end of mounting and shock absorber assembly is located between an inner annular mounting tube or sleeve 168 and the interior wall of an outer sleeve 180 adjacent to drill collar 10. The lower part of mounting sleeve 168 (the right end in FIG. 2) defines seat 18 and it is joined to component housing 20 to support the component housing. The shock absorber assembly is made up of seven ring elements 170 and two bumper elements 172. Each of the ring elements 170 is composed of an outer steel ring 174 and inner steel ring 176 and a ring 128 of rubber extending between and being bonded to the outer and inner rings 174 an 176. Outer rings 174 abut outer sleeve 180 which is adjacent the inner wall of drill collar 10 and is locked to the drill collar by a split ring 175 and the threaded assembly shown in FIG. 2. The inner rings 176 are adjacent to mounting sleeve 168. Inner steel rings 176 are all locked to sleeve 168 by a key 182 in keyways in the rings 176 and in sleeve 168; and the lowermost outer ring 174 is locked by a key 184 in a keyway in tube 180; the key extending into a notch in the ring assembly. Thus, mounting sleeve 168 and 180 are locked against rotation relative to each other. It is necessary to lock these elements against rotation relative to each other, or else relative rotation could result in twisting and breaking of electrical connections in the system below the shock absorbers. The rubber rings 178 also each have a central passageway 186 which are in alignment to form a flow passage through the rings. These rings are essentially identical to those shown in U.S. Pat. No. 3,782,464 under which the assignee of the present invention is licensed.

The bumpers 172 of the mounting and shock absorber assembly each include a ring 188 with an inwardly extending central rib 190. Rubber bumpers 191 are mounted on each side of the ribs 190, whereby the bumper elements 172 each serve as double ended bumpers to absorb overloads in both the upstream and downstream direction. The entire ring and bumper assembly is held in position by exterior lock ring 192, retaining ring 194 (which also locks the lowermost ring against rotation) and interior lock nut 196. A spacer 198 determines the axial location of the assembly.

The ring elements 170 and the two pairs of double bumpers 172 cooperate to provide vibration damping (achieved by the rings where the rubber elements act as springs) and absorption of overload of the upstream and downstream direction (absorbed by the annular rubber rings 191) when contacted by generally complimentarily shaped annular ribs 200 extending from rings 202 adjacent to mounting tube 168. The bumpers are also as described in U.S. Pat. No. 3,782,464, with ribs 200 slightly angled with respect to the surfaces of rings 191.

As can be seen in FIG. 2, a mud flow leakage path exists through the mounting and shock absorber assembly in the space between the outer and inner portions of the bumper assembly and the holes through the rubber rings. This leakage path is intentionally provided to prevent damage in the event the normal flow path for the mud between seat 18 and valve 16 is blocked off (other than during mud pulse generation). However, when valve 16 is moved toward seat 18 to generate mud pulses, it is desired to block off this leakage path in order to maximize the strength of the mud pulse. To that end, as the mud pulse is generated, the reaction load in the system tends to close down the spaces between the inner and outer portions of the bumper elements, whereby the bumper elements also serve as labyrinth seals to shut off the leakage flow of mud.

The mounting and shock absorber assembly described above with respect to FIG. 2 achieves an important advantage in that all of the shock absorber assembling for the mud pulse valve and other components located at the upper portion of the drill collar segment are located at one end of the drill collar and on only one side of the components whose shock load is being absorbed (i.e. the mud pulse valve assembly, the components and component housing 20, and the turbine). Also, the shock loads from these heavy upper components are absorbed by the upper shock assembly, and the lower sensor components are isolated from these upper shock loads, such as occur when the mud valve is pulsed.

With this mounting and shock absorber assembly, it is not necessary to locate additional shock absorber elements for these components near or downstream of the turbine. The turbine casing is retained in a centralizing spider 38 which provide the only additionally required mounting and support structure for these components in the system. Since no additional shock absorber or mounting structure is required downstream of the turbine for these components, it then becomes feasible to position the flexible electrical connector as shown, and there is no need to be concerned about critical space limitations to effect the electrical connection between the sensor elements and component housing 20, and this electrical connection can be achieved in a single one piece electrical connector.

Referring now to FIG. 3, the mounting and shock absorber assembly for the sensor element housing 35 and its contents are shown. As with the structure of FIG. 2, this mounting and shock absorber assembly is also composed of an array of rings and bumpers, with corresponding elements numbered as in FIG. 2 with a prime (′) superscript. In the lower shock absorber assembly of FIG. 3, an array of four ring assemblies 170′ and one bumper assembly 172′ is used, with the bumper being centrally located between two ring assemblies on either side thereof. This central location of the bumper is preferred for ease of assembly and symmetry purposes and is feasible in the structure of FIG. 3 since the bumpers in the FIG. 3 structure serve only an overload absorption function and do not have to serve any sealing function. However, there still is a mud leakage path through the shock absorber structure of FIG. 3 for pressure equalization purposes. By way of contrast, the bumpers in the FIG. 2 structure are at the upstream end of the array to perform the sealing function at the entrance to the structure. The mounting and shock absorber structure of FIG. 3 is located between an inner mounting tube 204 and an outer sleeve 206 which is grounded to the inner wall of drill collar 10 by split ring 175′ and the threaded assembly shown in FIG. 3. The shock absorber elements are held in place by threaded ring 208 pushing the outer rings against shoulder 210 and by nut 212 pushing the inner rings against spacer 214 and shoulder 216 on inner tube 204. The innermost steel rings of the two top (left) rings of the FIG. 3 structure are locked by a key 218 to inner mounting tube 204, and the outer steel ring of the top (left most) ring assembly is locked by a key 220 to outer sleeve 206. Thus, the lower shock absorber assembly and the sensor structure to which it is attached are locked against rotation to prevent breakage of electrical connection and to fix the reference angle for a directional sensor in housing 35. Inner mounting tube 204 is welded at its lowermost extension to spider 46, and mounting shaft 222 is bolted and keyed to spider 46. Shaft 222 extends to and is connected to sensor housing 35. Centralizing spiders 40 and 42 are located at each end of sensor housing 34 and an additional centralizing spider 44 may, if desired, be located midway along shaft 222 as shown in FIG. 1C. Thus, the entire sensor mechanism is mounted on just the two spiders 40 and 42 and supported for shock absorption by the connection through shaft 22 to shock absorber assembly 36 which performs all of the shock absorption and vibration damping functions for the sensor assembly. The sensor mechanism is thus isolated from shock loads from the mud pulse valve and other components at the upper end of the drill collar segment. The reference angle for a directional sensor in the sensor housing 35 is also fixed angularly with respect to the drill collar 10.

As with the shock absorber structure of FIG. 2, it will also be noted that the shock absorber structure of FIG. 3 is entirely located on one side (in this case the downsteam side) of the structure for which it serves as the shock absorber. Since all of the shock absorbing structure is located at one side of the sensor assembly, assembly and disassembly of the shock absorber structure is extremely simple. The total shock absorber assembly at the front and rear ends (i.e., the FIG. 2 and FIG. 3 structures) wherein each shock absorber assembly is entirely located on one side of the structure being protected achieves the significant advantage of being able to form the entire drill collar from a single length of drill collar pipe. If shock absorber structure were located at each end of the structure being protected, it would be necessary to use segmented pipe. The ability to use a one piece segment of drill collar for the entire mud pulse telemetry system eliminates pipe joints which pose the potential for structural failure and it also eliminates some potential leakage or washout sites in the drill string segment. The mounting and shock absorber assemblies also make it feasible to assemble the system components entirely outside the drill collar and then just insert and lock them in place.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A mounting and shock absorber assembly for borehole telemetry apparatus, including:

first bumper means;

second bumper means following said first bumper means;

a plurality of mounting rings following said second bumper means;

said first and second bumper means and said plurality of mounting rings being in a sequential axial array along the axis of a device to be mounted;

each of said bumper means having an outer ring, an inwardly projecting annular rib, annular elastomeric bumper elements adhered to each side of said rib, a pair of inner rings and an outwardly extending annular rib from each of said inner rings in opposed relationship to said elastomeric bumper elements;

each of said mounting rings having an outer ring, an inner ring, and elastomeric material extending between and being adhered to said rings;

the outer rings of said bumper means and the outer rings of said mounting rings being connected to an outer support sleeve, and the inner rings of said bumper means and the inner rings of said mounting rings being connected to structure to be mounted for suspension and shock absorption;

means defining a flow path for fluid through said assembly; and means for locking said assembly against rotation of said structure to be mounted relative to said support sleeve.

2. A mounting and shock absorber assembly as in claim 1 wherein said locking means includes:

first means for locking the outer ring of at least one mounting ring to said outer support sleeve; and second means for locking the inner ring of at least one mounting ring to said structure to be mounted.

3. A mounting and shock absorber assembly as in claim 2 wherein:

said first locking means is key means between and engaging said outer support sleeve and said outer ring of the mounting ring; and said second locking means is key means between and engaging said inner ring and said structure to be mounted.

4. A mounting and shock absorber assembly as in claim 1 wherein said locking means includes:

first means for locking the outer ring of at least one mounting ring to the outer support sleeve; and second means for locking the inner ring of each of said mounting rings to said structure to be mounted.

5. A mounting and shock absorber assembly as in claim 4 wherein:

said first locking means is key means between and engaging said outer support sleeve and a notch in said outer ring of the mounting ring; and said second locking means is key means between and engaging said inner ring and said structure to be mounted.

6. A mounting and shock absorber assembly as in claim 1 wherein:

said first and second bumper means and said plurality of mounting rings are all at one end of structure to be mounted for suspension and shock absorption; and including centralizing spider means at the other end of said structure to be mounted.

7. A mounting and shock absorber assembly as in claim 6 including a second assembly having:

third bumper means;

a second plurality of mounting rings;

said third bumper means and said second plurality of mounting rings being in a second axial array with said third bumper means being between said mounting rings;

said second axial array being associated with second structure to be mounted for suspension and shock absorption;

said third bumper means having an outer ring, an inwardly projecting annular rib, annular elastomeric bumper elements adhered to each side of said rib, a pair of inner rings and an outwardly extending annular rib from each of said inner rings in opposed relationship to said elastomeric bumper elements;

each of said second plurality of mounting rings having an outer ring, an inner ring, and elastomeric material extending between and being adhered to said rings;

the outer rings of said third bumper means and the outer rings of said second plurality mounting rings being connected to a second outer support sleeve, and the inner rings of said third bumper means and the inner rings of another plurality of said mounting rings being connected to a second structure to be mounted for suspension and shock absorption; and means for locking said second assembly against rotation of said second structure to be mounted relative to said second support sleeve.

8. A mounting and shock absorber assembly as in claim 7 wherein said locking means for said second array includes:

first means for locking the outer ring of at least one mounting ring to said second outer support sleeve; and second means for locking the inner ring of at least one mounting ring to said second structure to be mounted.

9. A mounting and shock absorber assembly as in claim 8 wherein:

said first locking means is key means between and engaging said second outer support sleeve and said outer ring of the mounting ring; and said second locking means is key means between and engaging said inner ring and said second structure to be mounted.

10. A mounting and shock absorber assembly as in claim 7 wherein said locking means includes:

first means for locking the outer ring of at least one mounting ring to the second outer support sleeve; and second means for locking the inner ring of each of said mounting rings to said second structure to be mounted.

11. A mounting and shock absorber assembly as in claim 10 wherein:

said first locking means is key means between and engaging said second outer support sleeve and a notch in said outer ring of the mounting ring; and said second locking means is key means between and engaging said inner ring and said second structure to be mounted.

12. A mounting and shock absorber assembly as in claim 7 wherein:

said third bumper means and said second plurality of mounting rings are all at one end of said second structure to be mounted for suspension and shock absorption; and including second centralizing spider means at the other end of said second structure to be ounted.

* * * * *

UNITED STATES PATENT AND TRADEMARK OFFICE
CERTIFICATE OF CORRECTION

PATENT NO. : 4,265,305

DATED : May 5, 1981

INVENTOR(S) : Frederick A. Stone et al

It is certified that error appears in the above-identified patent and that said Letters Patent are hereby corrected as shown below:

Column 7 between lines 14 and 15 (original application, page 12, line 13) insert -- a removeable plug 160. The oil fills the interior --.

Column 7 line 19, cancel "rim".

Signed and Sealed this

*Twenty-seventh* Day of *October 1981*

[SEAL]

*Attest:*

GERALD J. MOSSINGHOFF

*Attesting Officer* *Commissioner of Patents and Trademarks*